Oct. 19, 1954   D. B. DOOLITTLE   2,692,099
AIRCRAFT LANDING GEAR PLANING SURFACE DIHEDRAL CONTROL
Filed Aug. 28, 1951
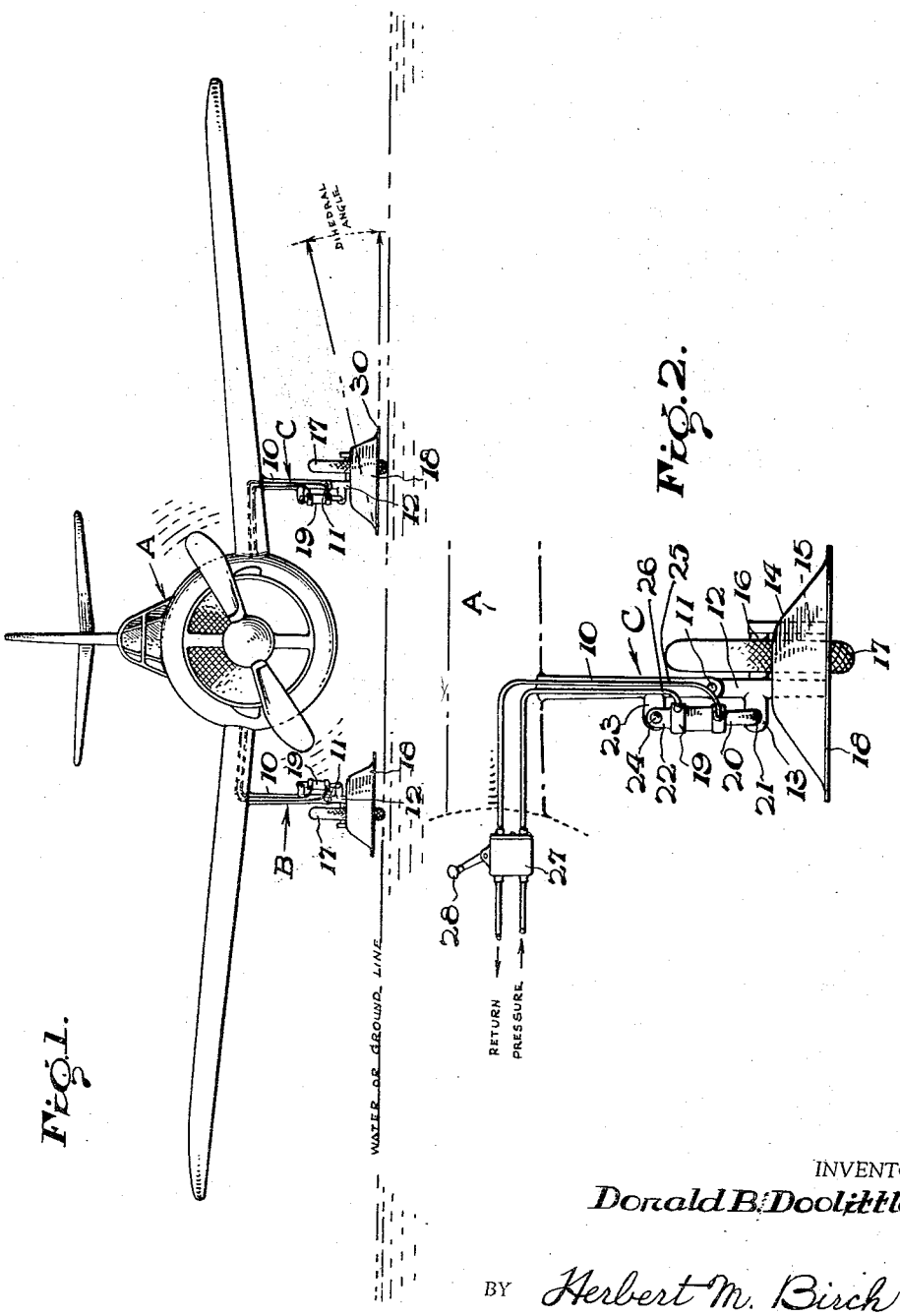
INVENTOR
Donald B. Doolittle.
BY Herbert M. Birch
ATTORNEY Patented Oct. 19, 1954

2,692,099

UNITED STATES PATENT OFFICE 2,692,099

AIRCRAFT LANDING GEAR PLANING SURFACE DIHEDRAL CONTROL

Donald B. Doolittle, Wilmington, Del., assignor, by mesne assignments, to All American Engineering Company, Wilmington, Del., a corporation of Delaware Application August 28, 1951, Serial No. 244,008

6 Claims. (Cl. 244—108)

The present invention relates to improvements for control of aircraft undercarriages, such as illustrated and described in prior co-pending application, Serial Number 142,654, filed February 6, 1950, for Planing Surfaces for Aircraft and Hydrocraft, now Patent Number 2,647,709, issued August 4, 1953. This type of undercarriage permits safe landings on various surface mediums, as water, snow, mud, grass or any combination of these mediums. Operating aircraft from the above mentioned surface mediums or solid terrain requires that the planing surface trim be changed to the best position for the surface encountered, trim angle being controlled by angular movement of the planing surface about an axis parallel to the lateral or transverse axis of the supported aircraft as illustrated and described in prior co-pending application Serial Number 233,042, filed June 22, 1951. Now with the present invention the dihedral angle of the planing surface is made adjustable, that is, angular movement of the planing surface about an axis parallel to the longitudinal axis of the supported aircraft.

Accordingly, the principal object of the present invention is to provide novel means for controlling the dihedral angle of each of the planing surfaces of a ski, hydro-ski, or the like for best performance on each surface medium encountered.

Another object is to provide a remote control system for adjusting the dihedral angle of the planing surface members when desired by the pilot of an aircraft equipped therewith from the cockpit.

Still other objects are to provide a dihedral angular adjustment parallel to the ground line to prevent excess wear on the edges of the planing surfaces and on water surfaces means are provided to raise the outboard edges for keel effect and to prevent the edges from submerging when skidding on the water due to wind or turns.

Still another object is to provide a method for breaking loose from ice and snow when the planing surface is frozen to the ice surface.

Yet another object is to provide dihedral angular positions on water surfaces or the like to thereby throw the spray in the desired direction away from the aircraft structure.

With these and other objects in view which will become apparent as the invention is fully understood, the same resides in the novelty of construction, combination and arrangement of elements hereinafter described in detail as illustrative of one embodiment thereof. However, it is to be expressly understood that other means may be employed to change the dihedral angles, and to determine the scope of the present invention reference should be had to the appended claims.

The description is intended to be read in conjunction with the accompanying drawings, which for the sake of clarity leave off the structural features of the above referred to co-pending applications and wherein:

Figure 1 is a front view in elevation of an aircraft equipped with planing surface landing gear and dihedral angle controls therefor.

Figure 2 is a detail view in elevation of one planing surface illustrating fluid pressure control means for positioning the surface to dihedral angular positions.

Referring in detail to the drawings and first with reference to Figure 1, there is shown an aircraft A equipped with landing gear B and C. B and C are both identical and therefore a detailed description of landing gear C, shown in Figure 2, only is given. The landing gear C comprises a strut 10, which may be the usual shock absorbing oleo except that at the lower end is a transverse opening receiving a pivot pin 11 and the apertured end of a vertical shaft 12. The aperture in the shaft 12 is aligned with the transverse opening in the strut, whereby the pin 11 serves as a pivot member. The shaft 12 includes a right-angled lug 13 with an opening and extends downward through one side of the longitudinal supporting rib 14. The rib 14 has another vertical shaft 15 extending upward from the other opposite side thereof and a transverse axle 16 for an auxiliary landing wheel 17 rotatable thereon. The wheel 17 is free to turn in a slot formed in the planing surface 18. Wheel 17 is optional and may not be included as it is seldom needed.

Thus it is observed that the pivot pin 11 permits dihedral angular positioning of the planing surface 18 as indicated by the arrows in Figure 1. Any suitable means may be provided for angling the surface 18 and one means illustrated is by the hydraulic cylinder 19, piston rod 20 and its pivotal connection to the apertured lug 13 by pivot pin 21. The upper end of cylinder 19 is formed with an apertured lug 22 pivoted to a second apertured lug 23 on a pin 24.

Inside the cylinder 19 is a piston, not shown, connected to piston rod 20 and fluid feed lines 25 and 26 are respectively connected to openings at each of the respective ends of the cylinder. The feed lines or remote control power supply circuit according to the operation of a pilot's dihedral control valve 27 serve as either a pressure line or a return line to the cylinder attached between the pivot pins 21 and 24, the pivot 21 being on the planing surface 18 and the pivot 24 being fixed on the structure of the landing gear.

*Operation*

From the foregoing description the operation is probably apparent. For example, actuation of valve 27 by the pilot through handle 28 supplies pressure through line or conduit 26 into the cylinder 19 on the upperside of the piston therein. This causes the outboard edge 30 to be swung upward on pivot 11 as shown in Figure 1 to a dihedral angle according to the extent of movement of the valve handle 28 and resulting degree of valve opening.

Thus there is provided a dihedral angle positioning system for aircraft for use with planing surfaces such as illustrated and described in the foregoing identified co-pending applications. Also, the many advantages of the present invention are as follows:

1. Excess wear is prevented on hard terrain by adjustment of the planing surface parallel to the ground.
2. Keel effect and prevention of the planing surface edges from submerging when skidding on water due to turns or wind is accomplished by slightly raising the outboard edges of the surfaces.
3. High dihedral angles to allow for efficient high speed rough water operation with low vertical accelerations and low dihedral angles to allow for efficient low speed water operation may be provided by remote control.
4. The dihedral control can facilitate the retraction and stowing of this type of landing gear.
5. The dihedral control provides a method for breaking loose from ice and snow when the planing surface is frozen to the ice surface.

Without further description it is thought that the many advantages of the present invention will be apparent and while only one embodiment is illustrated, it is to be expressly understood the same is not limited thereto, as various changes may be made in the parts and combinations thereof as will now appear to those skilled in the art. For a definition of the limits of the invention, reference should be had to the appended claims.

What is claimed is:

1. A landing gear for land type aircraft having a fixed strut member with a planing surface unit pivotally connected to the end thereof, power means carried by said strut and connected to a side of said unit for adjusting the dihedral angle of the planing surface unit, control means for said power means, and a remote control power supply circuit connecting the control means to said power means carried by said strut and connected to a side of said planing surface unit.

2. A landing gear for land type aircraft with a fuselage and having an undercarriage including a fixed strut, support means pivoted to the end of the strut, a planing surface unit carried by said means, and control means connected to a side of said unit and an intermediate portion on said strut for adjusting the dihedral angle of said unit, said control means comprising a fluid cylinder connected to a source of fluid supply, and a pilot actuated control lever and valve system mounted in the fuselage of the aircraft carrying the same connected by fluid lines to each end of the cylinder to adjust said pivoted support means, to thereby raise and lower the outboard edges of said planing surface unit.

3. An undercarriage for aircraft comprising a fixed strut, a support element on said strut, means pivoted to the end of the strut, an axle mounted transverse the said means, a wheel on the axle of the said pivoted means, a planing surface formed with an opening for the wheel carried by said axle and of said pivoted means, a motor operatively connected to said pivoted means and supported on said support element, and pilot power circuit motor control means operatively connected to said motor to pivot the planing surface on the said pivoted means at the end of the strut about an axis parallel to the longitudinal axis of the aircraft.

4. An undercarriage for aircraft comprising a fixed strut, a shaft pivoted to the end of said strut, an axle mounted transverse the end of said shaft, a wheel on the axle, a planing surface formed with a wheel opening and connected to said shaft, vertically spaced lugs with an opening, one carried by said strut and the other by said shaft pivoted to the strut, a hydraulic motor including a cylinder and a piston rod pivotally connected between the said lugs, and remote control means for actuating said motor to raise and lower the outboard edges of each respective connected planing surface.

5. In a landing gear of the class described having a planing surface and a fixed strut, said planing surface including a supporting unit having a shaft pivoted to the lower end of the strut on a longitudinal axis parallel to the longitudinal axis of a supported aircraft, and power means connected to said fixed strut and said pivoted shaft adapted to pivot the shaft to dihedrally angle said planing surface.

6. The landing gear arrangement described in claim 5 wherein the said fixed strut and said pivoted shaft are each formed with a projecting lug on each side of the pivot and wherein said means comprises a hydraulic motor pivoted at each end to one of the lugs.

References Cited in the file of this patent

UNITED STATES PATENTS

| Number | Name | Date |
|---|---|---|
| 2,085,295 | Campbell | June 29, 1937 |
| 2,106,934 | Saulnier | Feb. 1, 1938 |
| 2,263,800 | Dobson | Nov. 25, 1941 |
| 2,532,611 | Ditter | Dec. 5, 1950 |
| 2,563,263 | Nicholl | Aug. 7, 1951 |

FOREIGN PATENTS

| Number | Country | Date |
|---|---|---|
| 223,618 | Great Britain | Oct. 24, 1924 |
| 553,450 | Great Britain | May 21, 1943 |